United States Patent
Burgos et al.

(10) Patent No.: US 10,055,673 B2
(45) Date of Patent: Aug. 21, 2018

(54) METHOD AND DEVICE FOR PROCESSING AN IMAGE OF PIXELS, CORRESPONDING COMPUTER PROGRAM PRODUCT AND COMPUTER-READABLE MEDIUM

(71) Applicant: THOMSON LICENSING, Issy les Moulineaux (FR)

(72) Inventors: Xavier Burgos, Barcelona (ES); Julien Fleureau, Rennes (FR); Francois Le Clerc, L'Hermitage (FR)

(73) Assignee: THOMSON LICENSING, Issy les Moulineaux (FR)

( * ) Notice: Subject to any disclaimer, the term of this patent is extended or adjusted under 35 U.S.C. 154(b) by 81 days.

(21) Appl. No.: 15/249,449

(22) Filed: Aug. 28, 2016

(65) Prior Publication Data
US 2017/0061254 A1    Mar. 2, 2017

(30) Foreign Application Priority Data
Aug. 28, 2015 (EP) .................... 15306328

(51) Int. Cl.
| | | |
|---|---|---|
| G06K 9/62 | (2006.01) | |
| G06K 9/32 | (2006.01) | |
| G06T 7/77 | (2017.01) | |
| G06K 9/52 | (2006.01) | |
| G06K 9/66 | (2006.01) | |

(Continued)

(52) U.S. Cl.
CPC ......... *G06K 9/6267* (2013.01); *G06K 9/3241* (2013.01); *G06K 9/52* (2013.01); *G06K 9/6282* (2013.01); *G06K 9/66* (2013.01); *G06T 7/0002* (2013.01); *G06T 7/77* (2017.01); *G06K 9/00281* (2013.01); *G06T 2207/20021* (2013.01); *G06T 2207/20076* (2013.01); *G06T 2207/20081* (2013.01)

(58) Field of Classification Search
USPC ....................................... 382/159
See application file for complete search history.

(56) References Cited

U.S. PATENT DOCUMENTS

| | | | |
|---|---|---|---|
| 8,170,372 | B2 | 5/2012 | Kennedy et al. |
| 8,436,913 | B2 | 5/2013 | Lanz et al. |

(Continued)

FOREIGN PATENT DOCUMENTS

| | | | |
|---|---|---|---|
| EP | 3136295 | * | 3/2017 |
| JP | 1999053547 | | 2/1999 |

(Continued)

OTHER PUBLICATIONS

Bourdev et al., "Poselets: Body Part Detectors Trained Using 3D Human Pose Annotations", 2009 IEEE 12th International Conference on Computer Vision, Kyoto, Japan, Sep. 29, 2009, pp. 1-8.

(Continued)

*Primary Examiner* — Jerome Grant, II
(74) *Attorney, Agent, or Firm* — Brian J. Dorini; Patricia A. Verlangieri

(57) ABSTRACT

A method for processing an image of pixels is described. The method includes determining a plurality of features representative of the image, obtaining both information representative of a probability of presence of an object in the image and information representative of a shape of the object by implementing a unique multivariate regression applied to at least a part of the features.

21 Claims, 3 Drawing Sheets

(51) Int. Cl.
G06T 7/00 (2017.01)
G06K 9/00 (2006.01)

(56) References Cited

U.S. PATENT DOCUMENTS

| | | | |
|---|---|---|---|
| 2007/0195996 | A1 | 8/2007 | Kitamura |
| 2008/0152218 | A1 | 6/2008 | Okada |
| 2008/0187213 | A1 | 8/2008 | Zhang et al. |
| 2013/0011030 | A1 | 1/2013 | Tzoumas et al. |
| 2014/0185924 | A1 | 7/2014 | Cao et al. |
| 2014/0254910 | A1* | 9/2014 | Jerebko .......... A61B 6/5211 382/132 |
| 2016/0117428 | A1* | 4/2016 | Jung ............... G06F 17/5009 703/2 |
| 2017/0061254 | A1* | 3/2017 | Burgos ............ G06K 9/3241 |
| 2017/0079599 | A1* | 3/2017 | Yoshida .............. G06T 7/40 |
| 2017/0109465 | A1* | 4/2017 | Wang ............. G06F 17/5018 |
| 2017/0138801 | A1* | 5/2017 | Kono ............... G01K 11/006 |
| 2017/0255648 | A1* | 9/2017 | Dube ............. G06F 17/30247 |

FOREIGN PATENT DOCUMENTS

| | | |
|---|---|---|
| JP | 2008112211 | 5/2008 |
| JP | 4532419 | 6/2010 |
| JP | 2012099070 | 5/2012 |

OTHER PUBLICATIONS

Bourdev et al., "Robust Object Detection Via Soft Cascade", 2005 IEEE Conference on Computer Vision and Pattern Recognition (CVPR), San Diego, California, USA, Jun. 20, 2005, pp. 1-8.

Burgos-Artizzu et al., "Robust face landmark estimation under occlusion", 2013 IEEE International Conference on Computer Vision, Sydney, Australia, Dec. 1, 2013, pp. 1-8.

Burl et al., "A Probabilistic Approach to Object Recognition Using Local Photometry and Global Geometry", 5th European Conference on Computer Vision, Freiburg, Germany, Jun. 2, 1998, pp. 1-14.

Cao et al., "3D Shape Regression for Real-time Facial Animation", 40th International Conference and Exhibition on Computer Graphics and Interactive Techniques, SIGGRAPH 2013, Los Angeles, California, USA, Jul. 21, 2013, pp. 1-10.

Cao et al., "Face Alignment by Explicit Shape Regression", 2012 IEEE Conference on Computer Vision and Pattern Recognition (CVPR), Providence, Rhode Island, USA, Jun. 16, 2012, pp. 2887-2894.

Cevikalp et al., "Face and Landmark Detection by Using Cascade of Classifiers", 10th IEEE International Conference and Workshops on Automatic Face and Gesture Recognition, Shanghai, China, Apr. 22, 2013, pp. 1-7.

Chen et al., "Joint Cascade Face Detection and Alignment", 13th European Conference on Computer Vision (ECCV), Zurich, Switzerland, Sep. 6, 2014, pp. 1-14.

Cootes et al., "Active Appearance Models", IEEE Transactions on Pattern Analysis and Machine Intelligence, vol. 23, No. 6, Jun. 2001, pp. 681-685.

Cootes et al., "Active Shape Models—'Smart Snakes'", British Machine Vision Conference, Leeds, United Kingdom, Sep. 1, 1992, pp. 266-275.

Cristinacce et al., "Boosted Regression Active Shape Models", British Machine Vision Conference, Warwick, United Kingdom, Sep. 10, 2007, pp. 1-10.

Dalal et al., "Histograms of Oriented Gradients for Human Detection", 2005 IEEE Conference on Computer Vision and Pattern Recognition (CVPR), San Diego, California, USA, Jun. 20, 2005, pp. 1-8.

Dantone et al., "Real-time Facial Feature Detection using Conditional Regression Forests", 2012 IEEE Conference on Computer Vision and Pattern Recognition (CVPR), Providence, Rhode Island, USA, Jun. 16, 2012, pp. 1-8.

Ding et al., "Features versus Context: An approach for precise and detailed detection and delineation of faces and facial features", IEEE Transactions on Pattern Analysis and Machine Intelligence, vol. 32, No. 11, Nov. 2010, pp. 2022-2038.

Dollar et al., "Crosstalk Cascades for Frame-Rate Pedestrian Detection", 12th European Conference on Computer Vision (ECCV), Florence, Italy, Oct. 7, 2012, pp. 1-14.

Dollar et al., "Fast Feature Pyramids for Object Detection", IEEE Transactions on Pattern Analysis and Machine Intelligence, vol. 36, No. 8, Aug. 2014, pp. 1532-1545.

Dollar et al., "The Fastest Pedestrian Detector in the West", British Machine Vision Conference, Aberystwyth, United Kingdom, Aug. 31, 2010, pp. 1-11.

Dollar et al., "Pedestrian Detection: An Evaluation of the State of the Art", IEEE Transactions on Pattern Analysis and Machine Intelligence, vol. 34, No. 4, Apr. 2012, pp. 743-761.

Duffy et al., "Boosting Methods for Regression", Machine Learning, vol. 47, No. 2-3, May 2002, pp. 153-200.

Efraty et al., "Facial Landmark Detection in Uncontrolled Conditions", 2011 International Joint Conference on Biometrics, Washington, District of Columbia, USA, Oct. 11, 2011, pp. 1-8.

Everingham et al., ""Hello! My name is . . . Buffy"—Automatic Naming of Characters in TV Video", British Machine Vision Conference, Edinburgh, United Kingdom, Sep. 4, 2006, pp. 1-10.

Felzenszwalb et al., "Object Detection with Discriminatively Trained Part Based Models", IEEE Transactions on Pattern Analysis and Machine Intelligence, vol. 32, No. 9, Sep. 2010, pp. 1627-1645.

Fleuret et al., "Fast Face Detection with Precise Pose Estimation", 16th International Conference on Pattern Recognition (ICPR), Quebec, Canada, Aug. 11, 2002, pp. 1-4.

Fleuret et al., "Stationary Features and Cat Detection", Journal of Machine Learning Research, vol. 9, Nov. 2008, pp. 2549-2578.

Freund, Y., "Boosting a weak learning algorithm by majority", Journal of Information and Computation, vol. 121, No. 2, Sep. 1995, pp. 256-285.

Freund et al., "Experiments with a New Boosting Algorithm", 13th International Conference on Machine Learning, Bari, Italy, Jul. 3, 1996, pp. 148-156.

Friedman J., "Greedy Function Approximation: A Gradient Boosting Machine", The Annals of Statistics, vol. 29, No. 5, Oct. 2001, pp. 1189-1232.

Ghiasi et al., "Occlusion Coherence: Localizing Occluded Faces with a Hierarchical Deformable Part Model", IEEE Conference on Computer Vision and Pattern Recognition (CVPR), Columbus, Ohio, USA, Jun. 23, 2014, pp. 1-8.

Girshick et al., "Efficient Regression of General-Activity Human Poses from Depth Images", 2011 IEEE International Conference on Computer Vision, Barcelona, Spain, Nov. 6, 2011, pp. 415-422.

Jesorsky et al., "Robust Face Detection Using the Hausdorff Distance", Third International Conference on Audio-and Video-based Biometric Person Authentication, Halmstad, Sweden, Jun. 6, 2001, pp. 90-95.

Kass et al., "Snakes: Active Contour Models", International Journal of Computer Vision, vol. 1, No. 4, Jan. 1988, pp. 321-331.

Lowe, D., "Distinctive Image Features from Scale-Invariant Keypoints", International Journal of Computer Vision, vol. 60, No. 2, Nov. 2004, pp. 91-110.

Mathias et al., "Face detection without bells and whistles", 13th European Conference on Computer Vision (ECCV), Zurich, Switzerland, Sep. 6, 2014, pp. 1-24.

Matthews et al., "Active Appearance Models Revisited", International Journal of Computer Vision, vol. 60, No. 2, Nov. 2004, pp. 135-164.

Milborrow et al., "Locating Facial Features with an Extended Active Shape Model", 10th European Conference on Computer Vision, Marseille, France, Oct. 12, 2008, pp. 1-11.

Oikonomidis et al., "Efficient Model-based 3D Tracking of Hand Articulations using Kinect", British Machine Vision Conference, Dundee, United Kingdom, Aug. 29, 2011, pp. 1-11.

Quinlan, J. R., "Induction of Decision Trees", Machine Learning, vol. 1, No. 1, Jan. 1986, pp. 81-106.

(56) References Cited

OTHER PUBLICATIONS

Ren et al., "Face Alignment at 3000 FPS via Regressing Local Binary Features", IEEE Conference on Computer Vision and Pattern Recognition (CVPR), Columbus, Ohio, USA, Jun. 23, 2014, pp. 1-8.
Saragih et al., "Deformable Model Fitting by Regularized Landmark Mean-Shift", International Journal of Computer Vision, vol. 91, No. 2, Jan. 2011, pp. 200-215.
Sauer et al., "Accurate Regression Procedures for Active Appearance Models", British Machine Vision Conference, Dundee, United Kingdom, Aug. 29, 2011, pp. 1-11.
Schapire, R. E., "The Strength of Weak Learnability", Machine Learning, vol. 5, No. 2, Jun. 1990, pp. 197-227.
Shotton et al., "Real-Time Human Pose Recognition in Parts from Single Depth Images", Communications of the ACM, vol. 56, No. 1, Jan. 2013, pp. 116-124.
Valstar et al., "Facial Point Detection using Boosted Regression and Graph Models", 2010 IEEE Conference on Computer Vision and Pattern Recognition (CVPR), San Francisco, California, USA, Jun. 13, 2010, pp. 1-8.
Weber et al., "Viewpoint-Invariant Learning and Detection of Human Heads", 4th IEEE International Conference on Automatic Face and Gesture Recognition, Grenoble, France, Mar. 28, 2000, pp. 1-8.
Yang et al., "Articulated Human Detection with Flexible Mixtures-of-Parts", IEEE Transactions on Pattern Analysis and Machine Intelligence, vol. 35, No. 12, Dec. 2013, pp. 2878-2890.
Yang et al., "Face Parts Localization Using Structured-Output Regression Forests", 11th Asian Conference on Computer Vision, Daejeon, Korea, Nov. 5, 2012, pp. 667-679.
Yang et al., "Recognizing Proxemics in Personal Photos", 2012 IEEE Conference on Computer Vision and Pattern Recognition (CVPR), Providence, Rhode Island, USA, Jun. 16, 2012, pp. 1-8.
Yuille et al., "Feature Extraction from Faces Using Deformable Templates", International Journal of Computer Vision, vol. 8, No. 2, Aug. 1992, pp. 99-111.
Zhu et al., "Face Detection, Pose Estimation, and Landmark Localization in the Wild", 2012 IEEE Conference on Computer Vision and Pattern Recognition (CVPR), Providence, Rhode Island, USA, Jun. 16, 2012, pp. 1-8.
Winn et al., "LOCUS; Learning Object Classes with Unsupervised Segmentation", 10th IEEE International Conference on Computer Vision, Beijing, China, Oct. 17, 2005, pp. 1-8.
Ali et al., "Joint Pose Estimator and Feature Learning for Object Detection", IEEE 12th International Conference on Computer Vision, Kyoto, Japan, Sep. 27, 2009, pp. 1373-1380.
Breiman, "Random Forests", Machine Learning, vol. 45, Oct. 2001, pp. 5-32.
Dollar et al., "Cascaded Pose Regression", 2010 IEEE Conference on Computer Vision and Pattern Recognition, San Francisco, California, USA, Jun. 13, 2010, pp. 1078-1085.
Murphy-Chutorian et al., "Head Pose Estimation in Computer Vision: A Survey", IEEE Transactions on Pattern Analysis and Machine Intelligence, vol. 31, No. 4, Apr. 2009, pp. 607-626.
Ozuysal et al., "Fast Keypoint Recognition Using Random Ferns", IEEE Transactions on Pattern Analysis and Machine Intelligence, vol. 32, No. 3, Mar. 2010, pp. 448-461.
Yuan et al., "Multiplicative Kernels: Object Detection, Segmentation and Pose Estimation", IEEE Conference on Computer Vision and Pattern Recognition, Anchorage, Alaska, USA, Jun. 24, 2008, pp. 1-8.
Yuan et al., "Parameter Sensitive Detectors", IEEE Conference on Computer Vision and Pattern Recognition, Minneapolis, Minnesota, USA, Jun. 18, 2007, pp. 1-6.

\* cited by examiner

METHOD AND DEVICE FOR PROCESSING AN IMAGE OF PIXELS, CORRESPONDING COMPUTER PROGRAM PRODUCT AND COMPUTER-READABLE MEDIUM

This application claims the benefit, under 35 U.S.C. § 119 of European Patent Application No. 15306328.4, filed Aug. 28, 2015.

1. TECHNICAL FIELD

The present disclosure relates to computer vision and more specifically to the computer vision problem of finding and identifying a given semantic category, i.e. objects, in an image or video sequence, also known as object recognition. More specifically, the present disclosure relates to correctly determining the shape of objects in images.

The principles of the present disclosure find particular application in any field implementing object recognition such as facial animation, human computer interaction, eye gaze correction for video conferencing, face retouching, forensics or detecting an animal and estimating its exact body pose.

2. TECHNICAL BACKGROUND

One of the major benefits of the increase in computational power has been a steady rise in the number of computer vision applications. Computer vision problems formerly impossible to solve in any reasonable amount of time have become more and more feasible.

Efficiently detecting and classifying objects in an image or video sequence is one of the main challenges of computer vision. Detection consists of giving a one-bit answer to the question "Is object/category x in the image?".

Several machine learning approaches have been applied to this problem, demonstrating significant improvements in object detection accuracy and speed.

In addition, most often just establishing the presence/absence of objects is not enough and one desires to know also their exact location in the image, or even independently detecting and localizing the parts of which the objects are composed.

As disclosed by P. Dollar and al. ("*Cascaded Pose Regression*") IEEE Computer Vision and Pattern recognition 2010 pp 1078-1085, in its simplest form, localization consists of identifying the smallest rectangular region of the image that contains the searched object but more generally, one wishes to recover the objects "shape".

Shape refers to the geometric configuration of articulated objects (and the parts of which they are composed) for example the configuration of the limbs on a human body or the layout of a vehicle. More broadly, shape is any set of systematic and parameterizable changes in the appearance of the object.

To this purpose landmark estimation methods have been developed and require the object to have been first correctly detected in a current image to test.

Among landmark estimation methods, the cascaded pose regression (CPR) technique as disclosed by P. Dollar, as cited above, is used for facial landmarks detection, also called shape estimation (where the term "shape" refers here to the set of landmarks locations characterizing the geometry of the face) as illustrated by FIG. 1 (disclosed by P. Dollar, as cited above) wherein each row 11, 12, 13 shows a test case culled from three different data sets.

More precisely, the cascaded pose regression (CPR) is formed by a series of T successive regressors $R^1 \cdots ^T$ that start from a raw initial shape guess $S^0$ (111) and progressively refine estimation, outputting final shape estimation $S^T$ (112). Shape S is represented as a series of P part locations $S_p = [x_p, y_p]$, $p \in 1 \ldots P$. Typically these parts correspond to facial landmarks. At each iteration, a regressor $R^t$ produces an update $\delta S$, which is then combined with previous iteration's estimate $S^{t-1}$ to form a new shape.

During learning, each regressor $R^t$ is trained to attempt to minimize the difference between the true shape and the shape estimate of the previous iteration $S^{t-1}$. The available features depend on the current shape estimate and therefore change in every iteration of the algorithm, such features are known as pose-indexed or shape-indexed features and the key of the CPR technique lies on computing robust shape-indexed features and training regressors able to progressively reduce the estimation error at each iteration.

The robust cascaded pose regression (RCPR) is an algorithm derived from CPR and that deals with occlusions as disclosed by one the inventors, X. P. Burgos-Artizzu et al. ("*Robust face landmark estimation under occlusion*"), IEEE International Conference on Computer Vision, Sydney 2013. This method requires ground truth annotations for occlusion in the training set. So instead of defining a part location by only its x and y coordinates, a visibility parameter is added and can also be learned at the same time as the part locations. However, the CPR, or even the RCPR, techniques requires that an object has been beforehand correctly detected and located in a current image to test.

In other words, such detection establishes if an object is present or not in the image and provides the location of such object in the image.

Then estimating the shape is performed. Thus, according to the prior art, to detect an object and determine its shape, two successive steps must be implemented one after the other, requiring two different approaches (i.e. one per step).

Such implementation according to the prior art presents thus the drawback of slowing down the entire process to determine a shape of an object and is complex to implement since two different approaches, each one with its own parameters have to be taken into account.

Thus, there remains a significant need for improving the shape estimation results, while reducing the processing time.

3. SUMMARY

The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy at least one of the drawbacks of the prior art with a method for processing an image of pixels.

Such a method comprises:
  determining a plurality of features representative of said image;
  obtaining both information representative of a probability of presence of an object in said image and information representative of a shape of said object by implementing a unique multivariate regression applied to at least a part of said features.

The present disclosure thus relies on a novel and inventive approach for the shape estimation of an object of a current image. Actually, the present disclosure benefits from the specific properties of a unique multivariate regression for delivering simultaneously both information representative of a probability of presence of an object in said image and information representative of a shape of said object.

Thus, compared to the shape estimation techniques of the prior art, wherein two successive steps must be implemented one after the other, each step requiring two different approaches (i.e. one per step), the proposed method implements only a single step by using a unique multivariate regression, which couples together both tasks of detecting an object and the task of determining the shape of such an object.

"Coupling both tasks" corresponds to the fact that both tasks: object detection on the one hand and shape estimation on the other hand, are communicating between them during the single multivariate regression and learn from each other, resulting in more robust detections and a more precise shape estimation.

Since both operations are performed at the same time by a single multivariate regression, for a current image the shape estimation is accelerated in comparison with the techniques of the prior art and can be thus performed "online".

In addition, regarding the methods of the prior art, a single computer program product is necessary to implements the method according to the present disclosure. Thus, with respect to the prior art, which usually requires two pieces of software for implementing two different approaches, one for object detection followed by one for shape estimation, the program code instructions for implementing the method according to the present disclosure take less place in the memory.

It has to be noted that a "multivariate regression" according to the present disclosure corresponds to a regression outputting a plurality of variables at a time.

For instance, considering that the object corresponds to a human or animal face, sixty-eight landmarks will be used for example to annotate such a face, sixty-eight landmarks are used to delimit the shape of such a face.

Such landmarks are located in the image by using, for example, 2D coordinates such as a couple (x,y) corresponding respectively to the abscissa and the ordinate of one landmark.

For such an application, the "multivariate regression" will consist in providing a vector comprising one hundred and thirty-six values at a time (i.e. 136=68×2). In other words, the multivariate regression will deliver simultaneously the coordinates of all the landmarks delimiting the shape of a detected object.

The method according to the present disclosure can be applied to an extremely wide range of applications for estimating the location and shape/orientation of an object in images/videos, which is the backbone of many visual recognition applications.

For instance, it can be applied to the detection of human faces or cars or pedestrians in traffic scenes, to name just a few.

According to a first aspect of the present disclosure, said features are shape-indexed by using a reference shape as an input to said unique multivariate regression.

For example, a feature is associated with a landmark used then to delimit an object's shape. According to the present disclosure such a feature describes the area of the image comprising the landmark associated with it.

Shape-indexed features (also known as pose-indexed features) first introduced by F. Fleuret et al. ("*Stationary features and cat detection*") Journal of Machine Learning Research volume 9 pp 2549-578, 2008, are weakly-invariant to pose and therefore the features computation can be obtained directly from a reference shape, which is predetermined during an initial phase and then used as an input for the method according to the present disclosure.

For instance, the type of said shape-indexed features belongs to the group comprising:
 a histogram of oriented gradients,
 a scale invariant image transform,
 a channel feature,
 a simple control point feature.

The histogram of oriented gradients, as disclosed by N. Dalai et al. ("*Histograms of oriented gradients for human detection*"), IEEE Conference on computer Vision and Pattern Recognition, 2005, is a feature descriptor used in computer vision for object detection.

The main idea behind the histogram of oriented gradients descriptor is that the local appearance of objects as well as the shape within an image can be described by the distribution of intensity gradients or edge directions. Hence, the image is divided into small regions called cells, the user can choose the size of these cells, as well as the overlap between two adjacent cells, and the number of orientation bins for each histogram, then a histogram of gradient directions is compiled for the pixels within each cell. The final vector of features is the concatenation of all these histograms. In order to overcome the problem of changes in illumination and shadowing, an histogram equalization can be performed on the whole image before the extraction of HOG features.

A feature corresponding to a Scale Invariant Image Transform (SIFT) is disclosed by D. G Lowe ("*Distinctive image features from scale-invariant key-points*") International Journal of computer Vision, volume 60, issue 2, pp 91-110, 2004. Such a shape-indexed features correspond to the transformation of image data into scale-invariant coordinates relative to local features.

Channel features are disclosed by P. Dollar et al. ("*The fastest pedestrian detector in the west*") Proceedings of British Machine Vision conference BMVC 2 (3), 2010. Such a channel feature corresponds to the weighted sum of a channel image, a channel image being obtained by applying a shift-invariant function to an inputted image.

Simple control point features as described by M. Ozuysal et al. ("Fast Keypoint recognition using random ferns") IEEE Transactions on Pattern Analysis and Machine Intelligence, volume 32, issue 3, pp 448-461, 2009 can also be used.

More precisely, according to a particular variant of this first aspect said reference shape is projected on at least one sliding window, said at least one sliding window delimiting an area of said image where said unique multivariate regression is applied.

In other words, the image processed according to the present disclosure is, for example, subdivided into a dense grid of a plurality of sliding windows, each sliding window densely sampling said image with varying positions and sizes.

A sliding window delimits thus the area of the image comprising one or several landmark(s) associated with the feature(s) describing said area.

The shape estimate is then obtained by concatenating all the local features computed at said various sliding windows (also called "patches").

According to an embodiment of the present disclosure, said method is iterative, implementing a plurality of iterations, wherein, from the second iteration, each iteration uses the result of the previous iteration.

In other words, the step of determining a plurality of features representative of the image and then the step of obtaining both information representative of a probability of presence of an object in said image and information representative of a shape of said object, are both iterated to obtain a refinement.

Starting from said reference shape, both the object detection providing a probability of presence of an object and the shape estimation will be refined at each iteration. Each iteration, uses the result of the previous iteration and corresponds thus to an update of both the class probability and of the shape estimation.

According to a particular aspect of such embodiment, said unique multivariate regression implements a cascade of regressors.

Such a "cascade" of regressors consists in filtering (i.e. prune) at each iteration the results provided by said regressors, by deleting the sliding windows wherein the probability of presence of an object (said probability being determined jointly with the shape estimation according to the present disclosure) is lower than a threshold computed during a training of said regressors.

The "cascade" filtering operation has been disclosed by L. Bourdev et al. ("*Robust object detection via soft cascade*"), IEEE Computer society Conference on Computer Vision and Pattern Recognition (CVPR), volume 2, 2005. However such a disclosure concerned only the object detection and not a joined object detection and shape estimation as proposed according to the present disclosure.

It has to noticed that the term "cascade" is always used in the present disclosure to indicate that a filtering operation, implementing a comparison to a threshold, is applied and does not mean "a series of successive pose regressions" as used by P. Dollar et al. in "*Cascaded Pose Regression*", IEEE Computer Vision and Pattern recognition 2010 pp 1078-1085.

Such a "cascade" yields to a fastest process of an image, which enables real-time big-data applications, an example of such big-data application being disclosed by P. dollar et al. ("*Crosstalk cascades for frame-rate pedestrian detection*"), European Conference in computer Vision ECCV, 2012).

According to a further aspect of such an embodiment, said cascade of regressors implements an additive update of both said information representative of a probability of presence of an object in said image and of said information representative of a shape of said object.

As a consequence, such an update is fast since a simple addition is performed.

According to a particular embodiment of the present disclosure, said unique multivariate regression implements at least one random forest regressor.

As disclosed by L. Breiman ("Random forests"), Machine Learning, volume 45, Issue 1, pp 5-32, random forests consist of an ensemble of binary decision trees, each trained using only a subset of the data (typically 30% of the available training examples randomly sampled using bagging techniques).

A decision tree is a predictive model, which learns a mapping between data observations and their associated target value, which can be a binary or a real value. More precisely, the main task of a decision tree is to solve a classification problem by asking a series of carefully crafted questions about the attributes of the test record. Each time an answer is received, a follow-up question is asked until a conclusion about the label of the record is reached. The series of questions and their possible answers can be organized in the form of a decision tree, which is a hierarchical structure consisting of nodes and directed edges. The tree has three types of nodes: a root node that has no incoming edges and zero of more outgoing edges, internal nodes, each of which has exactly one incoming edge and two or more outgoing edges, and leaf or terminal nodes, each of which has exactly one incoming edge and no outgoing edges. Each leaf is assigned to a class label. The non-terminal nodes contain attribute test conditions to separate records that have different characteristics.

As already known from the prior art, once trained, at test time, each decision tree of a random forest output the class probability (classification) or the mean prediction (regression). Then the final forest output is the mode of the classes (classification) or predictions (regression) of each the individual trees. Both the number of trees in the forest and depth of each decision tree are parameters to the algorithm.

It has to be noted that random forest are quite popular for the single object detection as such due to their robustness and low over-fitting qualities, but their use as regressors for jointly providing information representative of a probability of presence of an object in the processed image and information representative of a shape of said object has not been disclosed in the prior art and is the main topic of the present disclosure.

According to an embodiment of the present disclosure, said method comprises a previous training of said unique multivariate regression, said training being performed by using a dataset of training images.

Indeed, the multivariate regression can be trained separately from the implementation of the present disclosure, by a different device, and the trained multivariate regression is then provided as an input of said method.

Nevertheless, the present method can also implement the training of the used multivariate regression. Such a training has to be performed before the steps of determining a plurality of features for the processed image, which does not belong to the training images and which can be also called, in the following, the test image, and before the step of jointly obtaining both information representative of a probability of presence of an object in said image and information representative of a shape of said object. Said training is advantageously performed "offline" in order to permit a real time processing of the test image.

According to a particular aspect of said embodiment, when said unique multivariate regression implements at least one random forest regressor, said training is iterative and at a current iteration, each training images of said dataset of training images is weighted for its use during a following iteration, said weighting taking into account the result of said current iteration.

Such an aspect results in that the training images randomly selected by each binary decision tree of the random forests will be not selected considering that all the training images have an equal weight (i.e. uniform training sampling) but have different weight. Such a weight permits to influence and refine the training by selecting predominantly the images classified as incorrect during the first iterations of said training.

According to a particular feature of such an aspect, said weighting is exponential.

Such an exponential weighting permits to allocate a discriminative high weight (i.e. higher probability of being picked) to examples currently being incorrectly classified.

According to another particular aspect of said embodiment, said dataset of training images comprises:
- a first set of training images, which provides a positive classifying result when being processed by said multivariate regression, and
- a second set of training images, which provides a negative classifying result when being processed by said multivariate regression.

As a consequence, the multivariate regression is also trained to provide a negative classifying result.

More precisely, said second set of training images contains images where the object is not present and/or images where object landmark annotation is erroneous.

In this way, the multivariate regression is able to provide both information representative of a probability of presence of an object in said image and information representative of a shape of said object of training images, even if some of these training images present an erroneous landmark annotation. Thus, the results provided by such multivariate regression are more relevant trying to determine jointly both information representative of a probability of presence of an object in said image and information representative of a shape of said object of a test image.

Another aspect of the present disclosure pertains to a device for processing an image of pixels, said device comprising a processor configured to control:
- a module for determining a plurality of features representative of said image;
- a module for obtaining both information representative of a probability of presence of an object in said image and information representative of a shape of said object by implementing a unique multivariate regression applied to at least a part of said features.

Such a device is adapted especially for implementing the method for processing an image of pixels.

The present disclosure also concerns a computer program product downloadable from a communication network and/or recorded on a medium readable by a computer and/or executable by a processor, comprising program code instructions for implementing a method for processing an image of pixels.

The present disclosure also concerns a non-transitory computer-readable medium comprising a computer program product recorded thereon and capable of being run by a processor, including program code instructions for implementing a method for processing an image of pixels.

Such a computer program may be stored on a computer readable storage medium. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

It is to be understood that both the foregoing general description and the following detailed description are exemplary and explanatory and are not restrictive of the disclosure, as claimed.

It must also be understood that references in the specification to "one embodiment" or "an embodiment", indicate that the embodiment described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specific nature of the disclosure as well as other objects, advantages, features and uses of the disclosure will become evident from the following description of embodiments taken in conjunction with the accompanying drawings.

4. BRIEF DESCRIPTION OF THE DRAWINGS

Embodiments of the disclosure can be better understood with reference to the following description and drawings, given by way of example and not limiting the scope of protection, and in which:

FIG. 1, already presented in relation with prior art, shows an example of shape estimation, FIG. 2 shows schematically a diagram of the main steps of the method for processing an image of pixels according to the present disclosure;

Similar or same elements are referenced with the same reference numbers. The components in the figures are not necessarily to scale, emphasis instead being placed upon illustrating the principles of the disclosure.

5. DETAILED DESCRIPTION 5.1 General Principle

Figure 1:
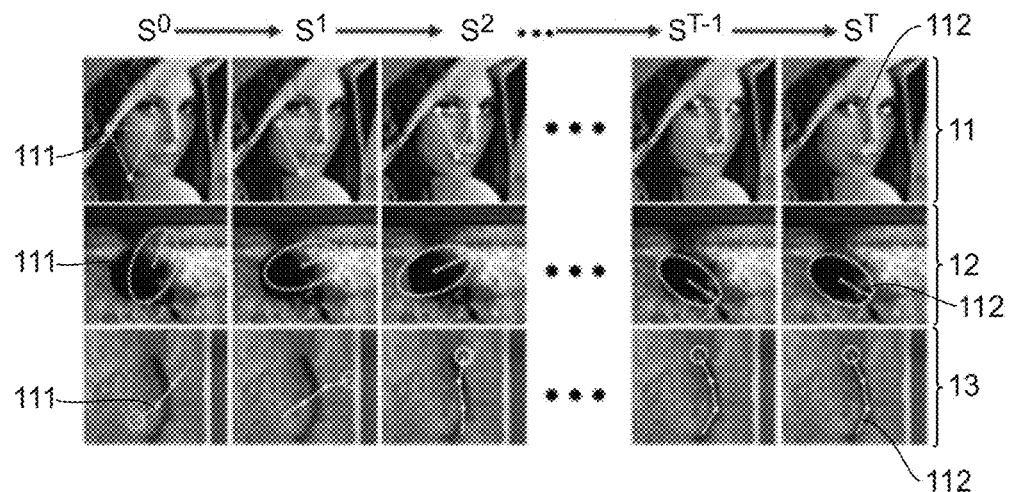
Figure 3:
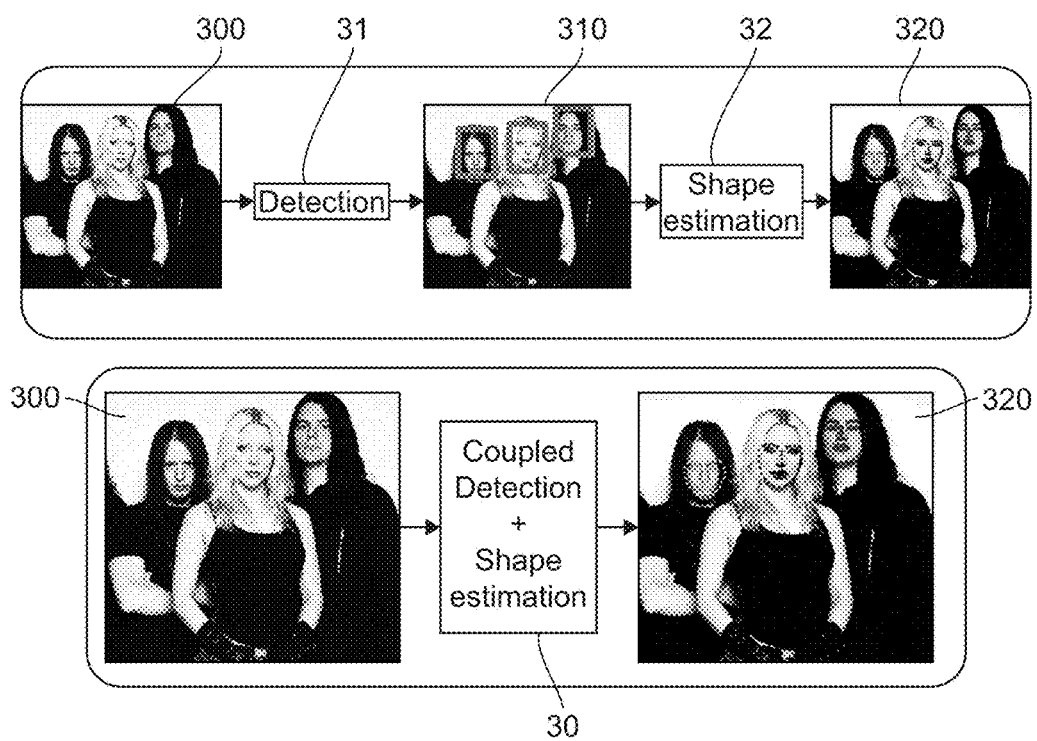
FIG. 3 illustrates the comparison between the prior art and the proposed method.

The general principle of the present disclosure is illustrated by FIG. 3 and consists in a new way for processing an image of pixels, in real-time, by coupling (30) together the detection and shape estimation to be able to detect all instances of a certain object in an image and estimates its shapes.

As illustrated by FIG. 3, the approach proposed according to the present disclosure is in clear contrast to most previous regression approaches, which operate on two independent steps, an object detection (31) on the one hand and a shape estimation (32) on the other hand.

Thus, it can be noticed that the present disclosure permits to avoid the intermediate result corresponding to the sole determination of the presence of an object or not, as illustrated by the rectangles (310) surrounding each faces of the processed picture (300), and provides directly a shape estimation (320) for each object of the processed image (300).

A description will now be given of a method, a corresponding device and a computer-readable storage medium for processing an image of pixels.

This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof.

Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks might occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for processing an image of pixels but extends to the processing of a plurality of images of pixels within a sequence of images because each image belonging to said sequence is sequentially processed as described below.

5.2 The Method for Processing an Image of Pixels

Figure 2:
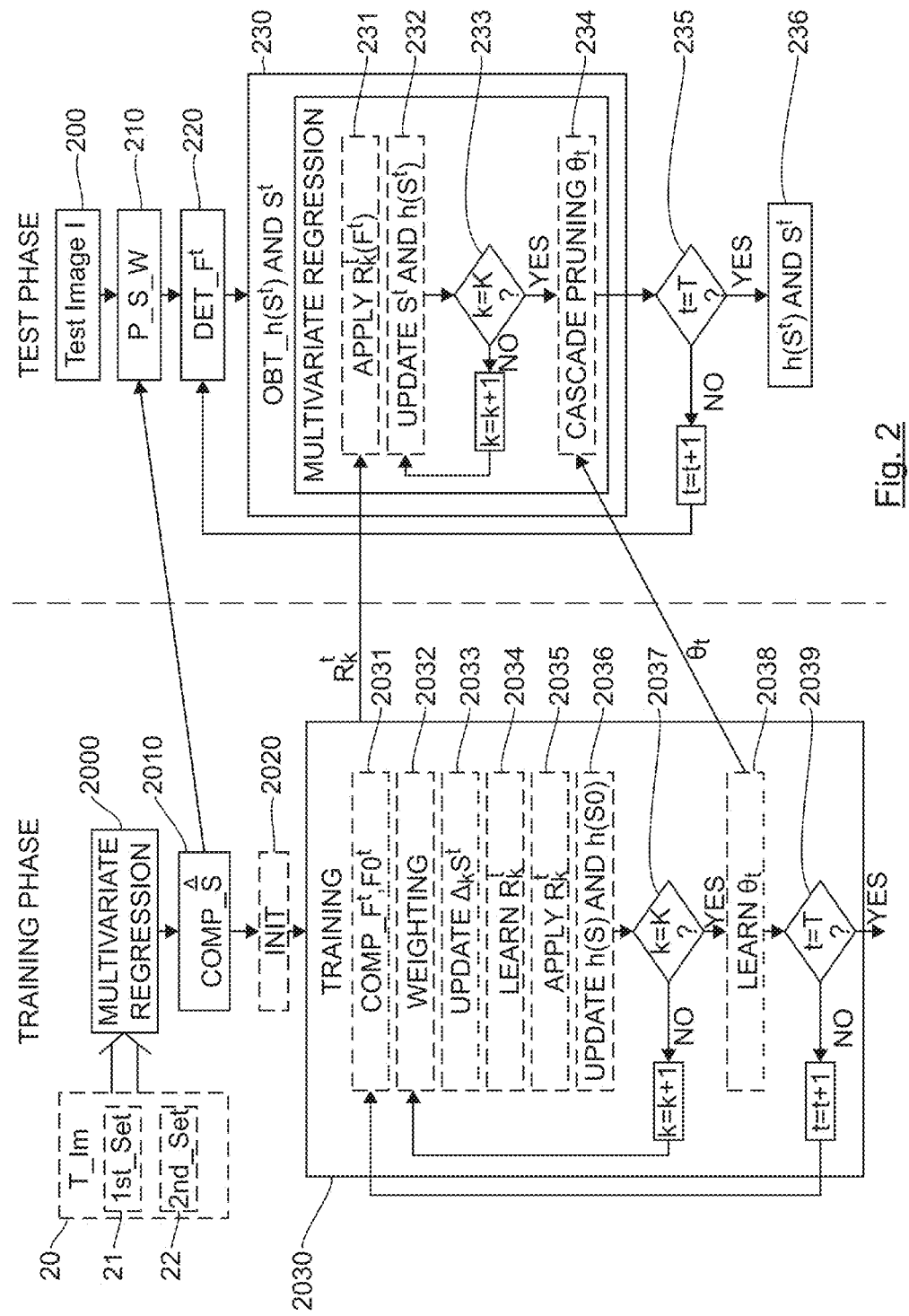
Figure 4:
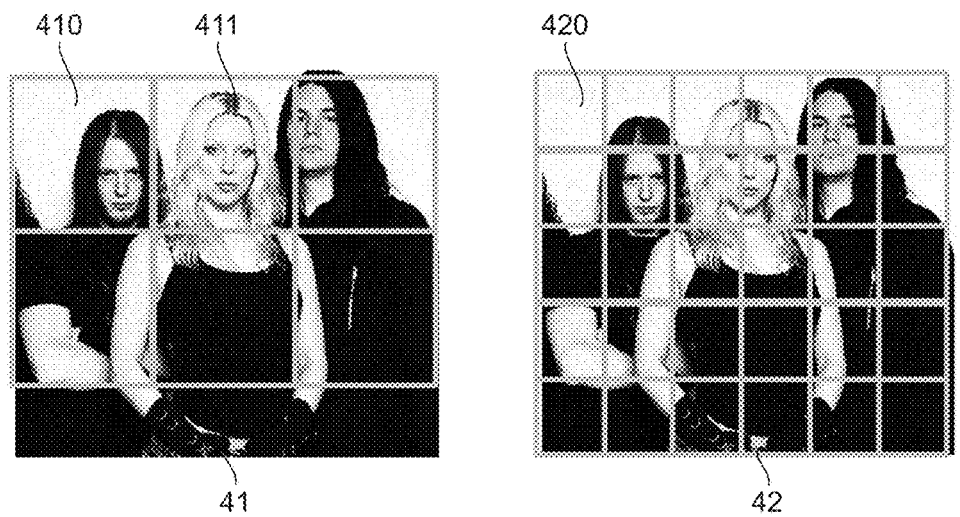
FIG. 4 illustrates an example of the "sliding window" dense sampling approach used during testing.

FIG. 2 shows schematically a diagram of the main steps of the method for processing an image of pixels according to one particular embodiment of the present disclosure, said method being performed by a device for processing an image of pixels, called test image I (200) in the following.

According to the present disclosure, the method for processing a test image I (200) can be advantageously performed online and consists in applying a trained multivariate regression (2000).

Annex A, which forms an integral part of the present description, proposes a practical example of program code instructions for implementing the method during the test phase according to the present disclosure.

During the test phase, as represented on the right of FIG. 2, a reference shape S is projected (210), according to the shape de-normalisation function of Annex A, on a dense sampling grid applied to said test image I (200), said sampling grid comprising at least one location of a sliding window. Said projection (210) provides an initial shape $S^0$ of a potential object in the test image (200), a shape corresponding to a collection L landmarks, each located at 2D pixels positions (x,y), such that $S \equiv <x,y> \in \mathbb{R}^L$.

As can be noted, according to this embodiment, such a reference shape $\hat{S}$ is provided as an input of said method by a training phase (implemented or not by the device according to the present disclosure) as described in detailed in the following.

FIG. 3 illustrates two different examples of dense sampling grids (41 and 42). Said dense sampling grids are used for sliding a window across the test image (200). Such sliding window corresponds to the area of the test image (200), which is delimited by one square of the dense sampling grid.

Considering the sampling grid 41 the sliding window will move from the location 410 to 411. Thus, the sampling grid 41 comprises N=6 locations of said sliding window. Regarding the right sampling grid (42) the size of the sliding window located on the location 420 is smaller than the sliding window (located for example at locations 410 or 411) of the left grid (41). Since, the scale of the right grid is smaller, it then comprises more locations N=30.

Such dense sampling grids (41 and 42) can be expressed by a vector $\Phi=[\phi_1, \ldots, \phi_i, \ldots, \phi_N]$.

Once such a projection $S^0$ is obtained it is then used to initialise information h representative of a probability of presence of an object in said image such that $h(S^0)=0$.

It has to be noted that such an initial shape $S^0$ obtained by projection on said dense sampling grid is also a vector of size N (N being the number of sliding windows location on said grid), as a consequence, said information $h(S^0)$ representative of a probability of presence of an object in said image is also a vector of size N comprising N zeros.

According to the embodiment, as illustrated by FIG. 2, said method for processing the test image I (200) is iterative (235) and comprises T iterations.

At each iteration, the determining (220) of a plurality of features representative of said test image I (200) and the obtaining (230) of both information representative of a probability of presence of an object in said image and information representative of a shape of said object are performed.

The $T^{th}$ iteration provides thus final information $h(S^T)$ representative of a probability of presence of an object and final information $S^T$ representative of a shape of said object.

At the first iteration, t=1, a plurality of features representative of said test image I (200) are determined (220), said features are shape-indexed by using said initial shape $S^0$ as an input.

For example, a feature is associated with a landmark used then to delimit an object's shape. According to the present disclosure such a feature describes the area of the image comprising the landmark associated with it.

For instance, the type of said shape-indexed features belongs to the group comprising:
a histogram of oriented gradients,
a scale invariant image transform,
a channel feature,
a simple control point feature.

Such shape-indexed features can also correspond to interpolated shape-indexed features, as disclosed by X. P. Burgos-Artizzu et al. ("*Robust face landmark estimation under occlusion*"), IEEE International Conference on Computer Vision, Sydney 2013.

Such shape-indexed features are concatenated to form, at each iteration t, a vector $F^t$.

These features depend on the current shape estimate and therefore change in every iteration t.

Once said vector of features $F^{t=1}$ is obtained, the step of obtaining (230) both information $h(S^1)$ representative of a probability of presence of an object in said test image I (200) and information $S^1$ representative of a shape of said object is performed by implementing a unique trained multivariate regression (2000).

First, $S^1$ is initialized so that $S^1=S^0$ (step 6 of the program code instructions of annex A). According to the embodiment illustrated by FIG. 2, said unique trained multivariate regression (2000) implements (231) K random forests $R_k^{t=1}$ per iteration, with for example K=500.

For k starting from 1 to K=500, each random forest $R_k^{t=1}$ delivers simultaneously a class probability $h_k^1(S^1)$ representative of a probability of presence of an object in said test image (200) and the regression delta $\Delta_k S$ permitting to transform said initial shape $S^0$ into the current shape $S^1$.

Then considering the outputs $h_k^1(S^1)$ and $\Delta_k S$ are used to update (232), using an additive update, both said Information $h(S^0)$ representative of a probability of presence of an object in said image and of said information $S^0$ representative of a shape of said object (as can be seen in steps numbered 9 and 10 of the program code instructions of annex A).

In other words, for each random forest of index k (iterations (233) on the variable k are performed to run through all the K random forests):

$$h(S^1)=h(S^1)+h_k^1(S^1) \text{ and } S^1=S^1+\Delta_k S$$

In other words, when k=K:

$$h(S^1)=h(S^1)+\Sigma_{k=1}^K h_k^1(S^1) \text{ and } S^1=S^1+\Sigma_{k=1}^K \Delta_k S,$$

In addition, regarding the embodiment illustrated by FIG. 2, said multivariate regression (2000) implements a cascade (234) of random forests instead of simple decision trees as done according to classification approaches of the prior art, or fern regressors as used according to shape estimation of the prior art as disclosed by M. Ozuysal et al. ("Fast Key-point recognition using random ferns" IEEE Transactions on Pattern Analysis and Machine Intelligence, Volume 32, Issue 3, pp. 448-467, 2009.

Such a "cascade" of random forests consists in pruning (234), at each iteration t, the results provided by said random forests, by deleting the sliding windows wherein the probability of presence of an object is lower than a threshold $\theta^1$ computed during a training (2030) of said regressors.

Indeed, as already said $h(S^1)$ and $S^1$ are vectors of size N (N being the number of sliding windows location on said grid), thus the pruning (234) will consists in keeping only the values $S_i^1$ except the ones such that $h(S_i^1)<\theta^1$.

In other words, after the pruning (234) $S^1=S^1\setminus\{S_i^1\}<\theta^1\}$.

At a second iteration t=2, the multivariate regression will perform the same substeps (231 to 234) but with other K random forests $R_k^{t=2}$ (k varying from 1 to K) and another cascade pruning threshold $\theta^2$ (where "2" is an index an not the square operator) and so on for the following iterations, said other K random forests $R_k^{t=2}$ and cascade pruning threshold $\theta^2$ being provided online by said trained multivariate regression (2000).

Thus, the K random forests $R_k^t$ applied during the $t^{th}$ iteration of the test phase represented on the right of FIG. 2 have been previously obtained during the $t^{th}$ iteration of training phase of the multivariate regression (2000) represented on the left of FIG. 2.

Optionally, and as represented on the right of FIG. 2, the method according to the present disclosure can also comprise a training (2030) of said multivariate regression (2000). Said training (2030) is advantageously performed offline once and for all and is valuable for later testing any test image (200).

Annex B, which forms an integral part of the present description, proposes a practical example of program code instructions for implementing such a training phase (2030) of the method proposed according to the present disclosure.

The multivariate regression model is learnt from a dataset (20) comprising, on the one hand a first subset (21) of positive training images $I_{1 \ldots M}$ (it has to be noted that the integer M corresponding to the number of positive training images is marked "N" in Annex B, but does not corresponds to the N locations of a sliding window of the dense sampling applied on one image (said image being training image or test image). Positive images contain examples of the object and each comes with its associated ground-truth shape $S_{1 \ldots M}$ (manually annotated), and on the other hand a second subset (22) of negative example images $I0_{1 \ldots M0}$ (not containing any instance of the object).

From this dataset (20) of training images, the average normalized shape $\overline{S}$ is first computed (2010) and then projected both on a dense sampling grid applied to positive images as well as to negative images (randomly sampled) to initialise (2020) a shape ($S^0$) and) ($S0^0$) on them.

It has to be noted that the dense sampling grid used during the test phase will be the same as the one used during the raining phase.

The training information h representative of a probability of presence of an object is also initialised (2020) to zero.

Said average normalized shape $\overline{S}$ is then used as the reference shape $\overline{S}$ during the test phase represented on the left of FIG. 2.

Then, positive (F$^r$)/negative (F0$^r$)/shape-indexed features are computed (2031). It has to be noted that the same technique to obtain (2031) shape-indexed features is used in the training phase and in the test phase (during the step of determining (220)).

For example, said shape-indexed features correspond to interpolated shape-indexed features, as disclosed by X. P. Burgos-Artizzu et al. ("*Robust face landmark estimation under occlusion*"), IEEE International Conference on Computer Vision, Sydney 2013.

Once features are computed (2031), learning (2034) a cascade of random forests (one random forest is referred by $R_k^t$) is processed (2035) iteratively (2039), where each single forest (2037) tries to improve the current probabilities assigned to positive and negative examples at the same time as it refines the shape estimate for the positive examples (line 11 in Annex B).

Inputs to the random forest learning are the positive/negative feature values F$^t$, F0$^t$, the current estimate of the positive/negative probabilities h(S), h(S0) and updated (2033) shape estimation delta (for positive examples only) $\Delta_k S^t$.

In the following, for simplicity of notation, the exponent t and the index k are deleted.

Each tree in the forest is trained using only a subsample of the available training examples. Instead of the classical uniform sampling, a "boosting-inspired" weighted sampling (2032) is performed (2032).

More precisely, the training images (i.e. examples) of the dataset 20 are ordered using an exponential weighting from the current estimate of the probabilities h(S), h(S0), giving more weight (i.e. higher probability of being picked) to examples currently being incorrectly classified (e.g. positives with low probability or negatives with high probability).

Once the subsampling (i.e. using the weighting (2032)) has been done, each tree is learned (2034) independently according to a classical random forest framework as the one disclosed by L. Breiman ("*Random forests*"), Machine Learning, volume 45, Issue 1, pp 5-32.

Construction begins at the root by choosing a binary test, splitting the training examples according to the test results and then constructing children nodes. The same procedure continues recursively, with each node being designated as a non-leaf node until the child node is of a maximum depth.

Once a leaf-node B is reached, it will store both the class probability h(B(S)) and the regression delta $D_B$. The leaf class probability will be computed as the proportion of positive examples $N_{posB}$ that finished in the leaf, while the regression delta is the average $\Delta S$ of all observed deltas (negative examples delta's are always set to zero):

$h(B(S)) = N_{posB}/N_B$, where $N_B = N_{posB} + N_{negB}$ $$D_B = \frac{1}{N_B} \sum_{n=1}^{N_B} \Delta S_n$$

One, which aims to minimize the uncertainty of the regression deltas, is picked as test to be performed at each node: $\mathrm{argmin} \|\Delta S - D_B\|^2$ The inventors of the present disclosure have shown that reducing the uncertainty in regression deltas automatically reduces also the class variance, avoiding to switch between a classification based test and a regression one. To apply the forest, each tree is applied to all examples and each will output the values stored at the leaf node reached (probability and regression delta). Then, the output (2036) of one random forest (of index k) is the average of the individual probabilities and regression deltas outputted by each tree:

$$h(S) = \frac{1}{Ntrees} \sum_{B=1}^{Ntrees} h(B(S))$$

$$\Delta S = \frac{1}{Ntrees} \sum_{B=1}^{Ntrees} D_B$$

Finally, the classification cascade threshold θ, which will be used at test time to prune (234) candidates early and avoid computation is also learnt (2038). In practice, the precision-recall curve from the out-put probability h(S) is computed and stored (together with the threshold value that generated each curve point) so that at test time (as represented on the left on FIG. 2) the threshold, according to where an operator want it to be placed in the curve (task-dependant), can be chosen.

5.3 Structures of the Device for Processing an Image of Pixels

On FIG. 2, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 5:
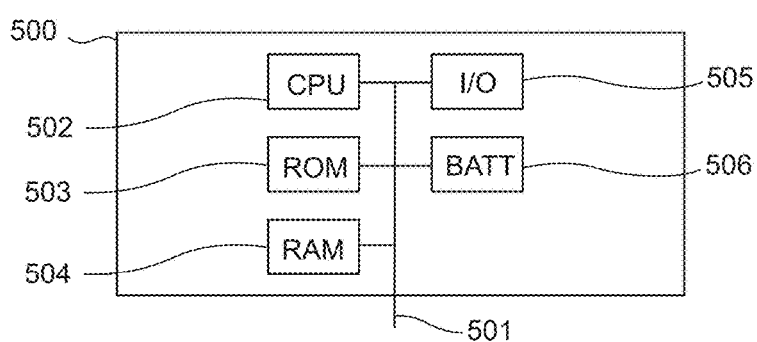
FIG. 5 shows an example of architecture of a device in accordance with an embodiment of the disclosure.

FIG. 5 represents an exemplary architecture of a device 500, which may be configured to implement a method for processing an image of pixels as described in relation with FIG. 2.

Device 500 comprises following elements that are linked together by a data and address bus 501:
- a microprocessor 502 (or CPU), which is, for example, a DSP (or Digital Signal Processor);
- a ROM (or Read Only Memory) 503;
- a RAM (or Random Access Memory) 504;
- an I/O interface 505 for transmission and/or reception of data, from an application; and a battery 506.

According to a variant, the battery 506 is external to the device. Each of these elements of FIG. 5 is well known by those skilled in the art and won't be disclosed further. In each of mentioned memory, the word «register» used in the specification can correspond to area of small capacity (some bits) or to very large area. ROM 503 comprises at least a program and parameters. Algorithm of the methods according to the disclosure is stored in the ROM 503. When switched on, the CPU 502 uploads the program in the RAM and executes the corresponding instructions.

RAM 504 comprises, in a register, the program executed by the CPU 502 and uploaded after switch on of the device 500, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment, said image of pixels is obtained from a source. For example, the source belongs to a set comprising:
- a local memory (503 or 504), e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface (505), e.g. a wire line interface (for example a bus interface, a wide area network interface, a local area network interface) or a wireles interface (such as a IEEE 802.11 interface or a Bluetooth® interface); and
- a picture capturing circuit (e.g. a sensor such as, for example, a CCD (or Charge-Coupled Device) or CMOS (or Complementary Metal-Oxide-Semiconductor)).

According to different embodiments, a bitstream delivered by said device is sent to a destination. As an example, said bitstream is stored in a local or remote memory, e.g. a video memory (504) or a RAM (504), a hard disk (503). In a variant, said bitstreams is sent to a storage interface, e.g. an interface with a mass storage, a flash memory, ROM, an optical disc or a magnetic support and/or transmitted over a communication interface (505), e.g. an interface to a point to point link, a communication bus, a point to multipoint link or a broadcast network.

Implementations of the various processes and features described herein may be embodied in a variety of different equipment or applications. Examples of such equipment includes said device, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, resident software, micro-code, and so forth, or an embodiment combining software and hardware aspects that can all generally be referred to herein as a "circuit", "module", or "system".

When the present principles are implemented by one or several hardware components, it can be noted that a hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas), which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

Furthermore, aspects of the present principles can take the form of a computer readable storage medium. Any combination of one or more computer readable storage medium(s) may be utilized.

Thus for example, it will be appreciated by those skilled in the art that the block diagrams presented herein represent conceptual views of illustrative system components and/or circuitry embodying the principles of the disclosure. Similarly, it will be appreciated that any flow charts, flow diagrams, state transition diagrams, pseudo code, and the like represent various processes which may be substantially represented in computer readable storage media and so executed by a computer or a processor, whether or not such computer or processor is explicitly shown.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

ANNEX A

| Notation | |
|---|---|
| Scalars (regular) | x |
| Vectors (bold) | $\mathbf{x} = [x1, x2, \ldots]$ |
| Constant vectors | $\mathbf{0} = [0, 0, \ldots], \mathbf{1} = [1, 1, \ldots]$ |
| Element-wise multiplication of $\mathbf{a}$ and $\mathbf{b}$: | $\mathbf{a} \cdot \mathbf{b}$ |
| Element-wise sum of $\mathbf{a}$ and $\mathbf{b}$: | $\mathbf{a} + \mathbf{b}$ |
| Grayscale digital image (2D M × N matrix): | $\mathbf{I} \in \mathbb{R}^{M \times N}$ |
| Image patch/window | $\varphi = \langle\text{row, col, width, height}\rangle \in \mathbb{R}^4$ |
| Object shape as collection L landmark 2D pixel positions: | $\mathbf{S} = \langle \mathbf{x}, \mathbf{y} \rangle \in \mathbb{R}^L$ |
| Feature computation function: | $f(\mathbf{I}, \varphi) \mapsto \mathbb{R}$ |

| Used functions |
|---|
| Function to extract image patch from shape:<br>$\varphi \equiv \text{extract}(S) \equiv \text{extract}(\langle x, y \rangle) \equiv \langle \min(x), \min(y), \max(x) - \min(x), \max(y) - \min(y) \rangle$<br>Shape normalization function:<br>$$\text{normalize}(S) \equiv \overline{S} \equiv \langle \overline{x}, \overline{y} \rangle \equiv \langle \frac{x - \min(x)}{\max(x)}, \frac{y - \min(y)}{\max(y)} \rangle$$<br>Shape de-normalization function (projection into image patch):<br>$\text{project}(\overline{S}, \varphi) \equiv S = \langle x, y \rangle \equiv \langle (\overline{x} * \text{width}) + \text{col}, (\overline{y} * \text{height}) + \text{row} \rangle$ |

```
Input:   Image I and learned model composed of:
         random forests R_{1..K}^{1..T}, cascade threshold θ^{1..T}, average
         normalized shape S̄,
         shape-indexed feature functions f(I, S)^{1..T}
      //  Dense grid of N image locations (sliding windows)
 1    Φ = [φ_1, φ_i ... φ_N]
      //  Project average shape onto windows
 2    S^0 = project(S̄, Φ)
      //  Initialize with uniform probabilities
 3    h(S^0) = 0
 4    for t = 1 to T do
      |    // compute shape-indexed features
 5    |    F^t = f^t(I, S^{t-1})
      |    // apply boosted random forest cascade
 6    |    S^t = S^{t-1}
 7    |    for k = 1 to K do
      |    |    // apply forest, get class prob. and reg. deltas
 8    |    |    < h_k^t(S^t), Δ_k S > = R_k^t(F^t)
      |    |    // Update class probability
 9    |    |    h(S^t) = h(S^t) + h_k^t(S^t)
      |    |    // Update shape estimation
10    |    |    S^t = S^t + Δ_k S
11    |    end
      |    // remove low prob. Candidates
      |    S^t = S^t \ {S_i^t ∈ h(S'_i) < θ^t}
13    | end
output: final shape estimation S^t with probability h(S^T)
```

ANNEX B

Input: Training Images $I_{1..N}$ ground-truth associated shapes $S_{1..N}$
and negative example images $I0_{1..N_0}$ // Normalize all training shapes 1    $\hat{S}_{1..N} = \text{normalize}(S_{1..N})$ // Compute average normalized training shape

```
 2   Ŝ = (1/N) Σ₁ᴺ S̄ₙ

// Initialize positive shape candidates with average shape
 3   Φ = extract(S); S⁰ = project(ŝ, Φ)
     // Initialize random negative shape candidates with average shape
 4   Φ₀ = randomPatches(I0); S0⁰ = project(ŝ, Φ₀)
     // Initialize class probabilities
 5   h(S) = 0; h(S0) = 0
 6   for t = 1 to T do
     |  // randomly generate and compute shape-indexed features positions
 7   |  [Fᵗ, F0ᵗ] = [fᵗ(I, Sᵗ⁻¹), fᵗ(I0, S0ᵗ⁻¹)]
 8   |  Sᵗ = Sᵗ⁻¹
 9   |  for k = 1 to K do
     |  |  // Update regression delta
10   |  |  ΔₖSᵗ = S − Sᵗ
     |  |  // learn single random forest
11   |  |  Rₖᵗ = learnForest(Fᵗ, F0ᵗ, h(Sᵗ), h(S0ᵗ), ΔₖSᵗ)
     |  |  // apply random forest, get class prob. And reg. delta
12   |  |  < hₖ(S), hₖ(S0), ΔₖS > = Rₖᵗ(Fᵗ)
     |  |  // Update classif. probability
13   |  |  h(S) = h(S) + hₖ(Sᵗ); h(S0) = h(S0) + hₖ(S0ᵗ)
     |  |  // Update shape estimation
14   |  |  Sᵗ = Sᵗ + ΔₖS
15   |  end
16   |  Θₜ = learnThresh(h(S), h(S0))
17   end
Output: Learned Model: learned boosted random forests R₁..ₖ¹..ᵀ, cascade thresholds Θ¹..ᵀ,
average training normalized shape ŝ and shape-indexed feature functions f (I, S)¹..ᵀ
```

The invention claimed is:

1. A method for processing an image, the method comprising:
   determining a plurality of features representative of said image;
   obtaining both information representative of a probability of presence of an object in said image and information representative of a shape of said object by implementing a unique multivariate regression applied to at least a part of said features;
   wherein said features are shape-indexed by using a reference shape as an input to said method and wherein said reference shape is projected on at least one sliding window, said at least one sliding window delimiting an area of said image where said unique multivariate regression is applied.

2. The method for processing an image according to claim 1, wherein said method is iterative, implementing a plurality of iterations, wherein, from the second iteration, each iteration uses the result of the previous iteration.

3. The method for processing an image according to claim 1, wherein said unique multivariate regression implements a cascade of regressors.

4. The method for processing an image according to claim 1, wherein said cascade of regressors implements an additive update of both said information representative of a probability of presence of an object in said image and of said information representative of a shape of said object.

5. The method for processing an image according to claim 1, wherein said unique multivariate regression implements at least one random forest regressor.

6. The method for processing an image according to claim 5, wherein said training is iterative and wherein, at a current iteration, each training images of said dataset of training images is weighted for its use during a following iteration, said weighting taking into account the result of said current iteration.

7. The method for processing an image according to claim 6, wherein said weighting is exponential.

8. The method for processing an image according to claim 1, wherein said method comprises a previous training of said unique multivariate regression, said training being performed by using a dataset of training images.

9. The method for processing an image according to claim 8, wherein said dataset of training images comprises:
   a first set of training images, which provides a positive classifying result when being processed by said multivariate regression, and
   a second set of training images, which provides a negative classifying result when being processed by said multivariate regression.

10. The method for processing an image according to claim 9, wherein said second set of training images comprises images, which comprise no object, and/or images where object landmark annotation is erroneous.

11. A non-transitory computer-readable medium comprising a computer program product recorded thereon and capable of being run by a processor, including program code instructions for implementing the steps of the method for detecting at least one fitting error according to claim 1 when it is executed by a processor.

12. A device for processing an image, said device comprising a processor configured to control:
   a module for determining a plurality of features representative of said image;
   a module for obtaining both information representative of a probability of presence of an object in said image and information representative of a shape of said object by implementing a unique multivariate regression applied to at least a part of said features;
   wherein said features are shape-indexed according to a reference shape used as input for determining features of said representative image and wherein said reference shape is projected on at least one sliding window, said at least one sliding window delimiting an area of said image where said unique multivariate regression is applied.

13. The device for processing an image according to claim 12, wherein the processing is iterative, implementing a plurality of iterations, wherein, from the second iteration, each iteration uses the result of the previous iteration.

14. The device for processing an image according to claim 12, wherein said unique multivariate regression implements a cascade of regressors.

15. The device for processing an image according to claim 12, wherein said cascade of regressors implements an additive update of both said information representative of a probability of presence of an object in said image and of said information representative of a shape of said object.

16. The device for processing an image according to claim 12, wherein said unique multivariate regression implements at least one random forest regressor.

17. The device for processing an image of according to claim 16, wherein said training is iterative and wherein, at a current iteration, each training images of said dataset of training images is weighted for its use during a following iteration, said weighting taking into account the result of said current iteration.

18. The device for processing an image according to claim 17, wherein said weighting is exponential.

19. The device for processing an image according to claim 12, wherein said processor comprises a previous training module for unique multivariate regression, said training being performed by using a dataset of training images.

20. The device for processing an image according to claim 19, wherein said dataset of training images comprises:
   a first set of training images, which provides a positive classifying result when being processed by said multivariate regression, and
   a second set of training images, which provides a negative classifying result when being processed by said multivariate regression.

21. The device for processing an image according to claim 20, wherein said second set of training images comprises images, which comprise no object, and/or images where object landmark annotation is erroneous.

* * * * *